US006013902A

United States Patent [19]

Shimp, Jr. et al.

[11] Patent Number: 6,013,902

[45] Date of Patent: Jan. 11, 2000

[54] RADIANT ELECTRIC HEATER

[75] Inventors: Harry B. Shimp, Jr., Chagrin Falls, Ohio; David H. Scott, Bristol; Steven M. White, Morristown, both of Tenn.

[73] Assignee: MinPat Co., Wilmington, Del.

[21] Appl. No.: 09/200,812

[22] Filed: Nov. 27, 1998

[51] Int. Cl.[7] .............................. H05B 3/68; C04B 35/14

[52] U.S. Cl. .................................... 219/451.1; 219/467.1; 501/133

[58] Field of Search ............................ 219/451.1, 452.11, 219/455.11, 455.12, 460.1, 461.1, 465.1, 467.1, 543, 544, 530, 531; 252/62; 501/11, 12, 133.84

[56] References Cited

U.S. PATENT DOCUMENTS

| | | | |
|---|---|---|---|
| 3,656,983 | 4/1972 | Sulinski | 106/38.2 |
| 3,737,624 | 6/1973 | Eilenberger | 219/543 |
| 3,869,334 | 3/1975 | Hughes et al. | 428/76 |
| 3,871,440 | 3/1975 | Horton | 164/165 |
| 4,221,672 | 9/1980 | McWilliams | 252/62 |
| 4,726,870 | 2/1988 | McWilliams et al. | 156/314 |
| 5,302,444 | 4/1994 | Jackson et al. | 428/228 |
| 5,439,624 | 8/1995 | Anderson et al. | 264/66 |

*Primary Examiner*—Sang Paik
*Attorney, Agent, or Firm*—John F. McDevitt

[57] ABSTRACT

A novel radiant electric heater construction is provided employing fused silica particulates as the thermal and electrical insulation medium in said device. Said insulation means is prepared in a particular manner providing a porous characteristic when employed together with operatively associated metal heat shield means in the heater device.

11 Claims, 1 Drawing Sheet

*Fig. 1*
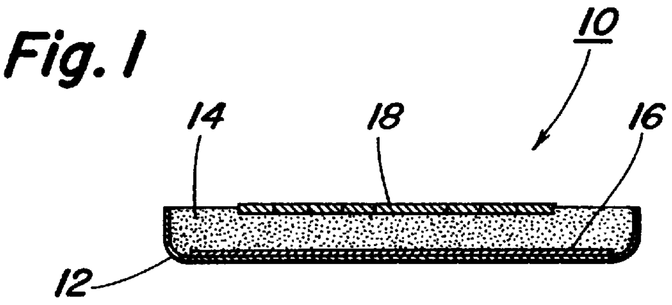
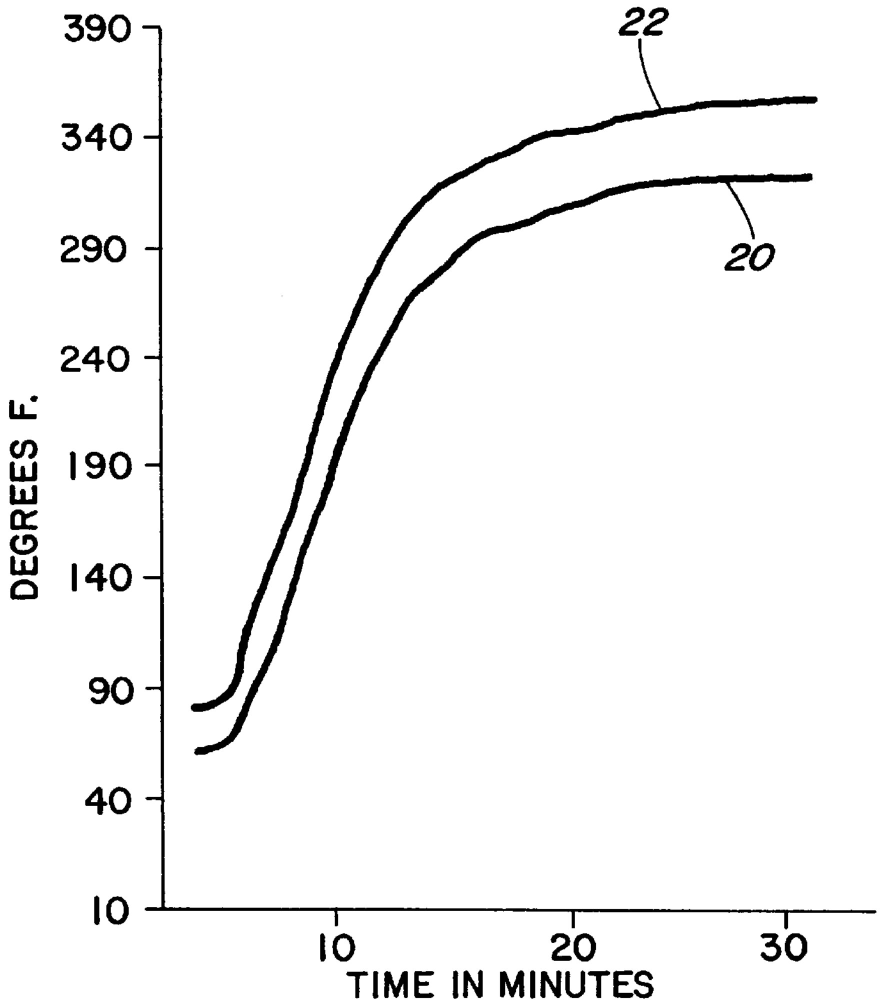
*Fig. 2*

RADIANT ELECTRIC HEATER

BACKGROUND OF THE INVENTION

This invention relates to a novel radiant electric heater construction especially adapted for use with top surface cooking appliances and more particularly to a combination of novel component parts in said type devices which can effectively serve to replace the customary construction.

Radiant electric heaters intended for top surface cooking appliances now employ "microporous" type thermal and electric insulation which can be molded or otherwise formed to provide the base component in said device when generally supported in a metal dish. Descriptions of said customary radiant electric heater construction can be found in U.S. Pat. No. 5,471,737, U.S. Pat. No. 5,512,731 and U.S. Pat. No. 5,517,002 which all include a requirement for said type insulation material in order to avoid overheating during device operation. A still further description for preparation of a satisfactory microporous insulation of this type can be found in U.S. Pat. No. 5,556,689 which includes a requirement for "a very high specific surface area" of the finely divided metal oxides being employed in order to achieve satisfactory thermal insulation.

The above described thermal insulation remains relatively expensive due to costs of preparation including needed raw materials, processing requirements and still other factors limiting availability. Thus, a preparation of suitable microporous insulation according to the foregoing references can involve elaborate processing techniques such as gel formation, controlled precipitation and fume deposition in order to control average particle size less than 100 nanometers. It would be desirable, therefore, to replace conventional microporous insulation now being used in radiant electric heaters by means which are far less costly as well as far more readily available. In doing so, it has now been discovered that fused silica of the type conventionally produced in a rotary electric arc furnace (such as disclosed in U.S. Pat. No. 4,217,462) and thereafter mechanically reduced by conventional means to produce a suitable particle size provides a satisfactory means of thermal and electric insulation for this product application. It remains only required with said substituted fused silica insulation to further include metal heat shield means in a manner to be disclosed hereinafter for a satisfactory retention of heat within the final device during its operation.

It is an important object of the present invention, therefore, to provide a radiant electric heater employing a novel combination of component parts.

It is another object of the present invention to provide a novel radiant electric heater employing fused silica particulates as the thermal and electrical insulation means in combination with operatively associated heat shield means.

Still another object of the present invention is to provide a novel preparation means for the particular fused silica material being employed in the disclosed heater device.

These and still further objects of the present invention will become more apparent upon considering the following detailed description of the present invention.

SUMMARY OF THE INVENTION

Fused silica particulates have now been found to provide effective thermal and electrical insulation means when disposed as a base component in the radiant electric heater device. More particularly, said novel insulation means can be deposited after preparation in various ways to be more fully described hereinafter into the conventional metal dish forming the bottom member in the present device. A metal heat shield is interposed between the insulation and the metal dish member for the purpose of reflecting heat energy back into the insulation and thereby help prevent heat escape from the device. Aluminum foil can provide a satisfactory heat shield material in the present device. A conventional resistance heating element such as disclosed in the previously cited prior art references is disposed atop the present insulation material to complete a representative heater device of the present invention.

The novel insulation means in the present device is produced in a particular manner providing a foam type relatively open lattice in the disposed fused silica particulates. The desired porous character of said insulation can be achieved by drying a liquid slurry of finely divided fused silica having an average particle size up to about minus 100 mesh United States screen size which further contains a suitable foaming agent such as an organic detergent, a conventional phosphate soap or the like. The slurry is first agitated sufficiently to form a frothy condition which can be produced with conventional high speed rotary blender means. A commercially available colloidal silica binder (Bindzel 30/A360) now being marketed by Akzo Nobel, Atlanta, Ga. is also included in the present liquid slurry containing the finely divided fused silica particulates for preparation of a stable porous structure in the dried composition. Drying of the agitated liquid slurry can be carried out in the customary manner with heating of the slurry to elevated temperatures up to 1000° F. having been found helpful in maintaining the desired degree of porosity in the final solid insulation. Other additives can also be incorporated in the liquid slurry to include opacifiers such as titanium dioxide particulates as well as chopped fiberglass fibers which can also prove helpful in maintaining physical integrity of the solid insulation. Freezing of the agitated slurry in a suitable cooling medium such as liquid nitrogen before the drying procedure takes place has also been found to improve heat retention in the present insulation with measured temperatures at the bottom surface of the present heater device not exceeding 350° F. during a half hour heating period.

In a different preferred embodiment, multiple dried cake layers of insulation produced as above described are physically stacked within the metal dish of the present heater device with additional metal heat shield components being placed between adjoining layers of insulation. By such means, heat retention can be modified in the present heater device to accommodate operating conditions of a particular cooking appliance without having to alter other components in the heater device itself. Accordingly, a specific heater device of the present invention having such multiple insulation layer configuration can comprise a metal dish member containing a lower insulation pad approximately 0.3 inch thick and an upper insulation pad approximately 0.4 inch thick with a first aluminum foil heat shield being placed therebetween, a second aluminum foil heat shield being interposed between the bottom of the lower insulation pad and the top surface of the metal dish, and a conventional resistance heating element being disposed on the top surface of the upper insulation pad. To facilitate assembly of the final heater device having either a single insulation pad or a multiple insulation pad configuration, the particular heat shield component being selected can be physically embedded in the bottom surface of the employed insulation pad or pads prior to said final assembly. Additionally, lower bottom operating temperatures have been measured in the present heater device when a multiple insulation layer configuration is employed.

BRIEF DESCRIPTION OF THE DRAWINGS

FIG. 1 is a cross-sectional view depicting a representative radiant electrical heater device of the present invention.

FIG. 2 is a graph illustrating heat retention in radiant heater devices of the present invention employing both single and dual insulation layer configurations.

DETAILED DESCRIPTION OF THE PREFERRED EMBODIMENTS

Referring to the drawings, FIG. 1 depicts a representative radiant electric heater of the present invention in cross-section which can have a circular or rectangular shape when viewed from the top direction. Said radiant heater 10 includes a bottom metal dish member 12, a base layer pad 14 of porous fused silica particulates according to the present invention being deposited within said metal dish member, a metal heat shield 16 being placed between the bottom surface of said insulation pad and the top surface of the metal dish, and a conventional resistance heating element 18 being disposed on the top surface of said insulation pad. Preparation of the insulation pad in said embodiment commenced with forming an aqueous slurry containing 1380 grams of the fused silica particulates having an average particle size of minus 100 mesh United States screen size combined with 1060 grams of the aforementioned colloidal silica binder and 20 grams of an organic detergent serving as the foaming agent. The slurry was next agitated in a conventional high speed rotary blender until foamed then frozen with liquid nitrogen to produce pads having varying thickness ranging from 0.3 inch up to 0.7 inch in thickness. The frozen pads were next placed in a conventional oven for drying up to 1000° F. during a one hour drying time. Various metals were employed as the heat shield component in the illustrated heater embodiment to include stainless steel and aluminum foil. Heating tests were conducted upon six inch diameter and eight inch diameter circular heaters constructed in the foregoing manner at power levels ranging from 785 watts being applied to the six inch diameter units and 1396 watts being applied to the eight inch diameter units.

The graph in FIG. 2 illustrates performance characteristics for the present heater device when constructed with a single insulation pad or dual insulation pads as hereinabove described. Curves 20 and 22 represent K type thermocouple measurements of temperature at the bottom surface of the dish member while the heater units were being operated at the above listed power levels. The temperatures were measured at one minute intervals during a thirty minute heating period for each of the different heating units. Curve 20 reports the bottom temperature for a single insulation pad device with a 0.7 pad thickness during said test period. The comparable measurements made upon the dual insulation pad construction having a 0.3 inch thick bottom pad and a 0.4 inch thick top pad are shown in curve 22. These results clearly indicate the suitability of the present radiant electric heater construction for general use in stove top cooking appliances.

It will be apparent from the foregoing description that novel means have been provided to construct a radiant electric heater having versatile end product applications. It will be apparent, however, that various structural modifications can be made in the present heater device without departing from the spirit and scope of the present invention. For example, still other additives than herein specifically disclosed can be incorporated into the disclosed insulation material without producing a deleterious effect such as colorants and the like. Likewise, it is contemplated that minor amounts of conventional additives to improve physical handling of the present insulation during processing or assembly of the heater unit can be employed. Consequently, it is intended to cover all modifications of the disclosed radiant electric device which may be devised by persons skilled in the art as falling within the true spirit and scope of the present invention.

We claim as new and desire to secure by Letters Patent of the United States is:

1. A radiant electric heater comprising a metal dish containing a base layer of thermal and electric insulation material, a metal heat shield interposed between said insulation material and said metal dish and a resistance heating element disposed on top of said insulation material, said insulation material comprising a deposited solid foam mass of non-porous fused silica particulates having an average particle size up to about minus 100 mesh United States screen size and with the porous characteristic being formed by void spaces between the deposited fused silica particulates.

2. The radiant heater of claim 1 wherein the base layer of insulation layer is formed with two layers of the fused silica particulates physically separated with an additional metal shield.

3. The radiant heater of claim 1 wherein the metal heat shield is physically embedded in the bottom surface of said insulation material.

4. The radiant heater of claim 1 wherein the metal heat shield comprises aluminum foil.

5. The radiant heater of claim 1 wherein the insulation material further contains titanium dioxide particulates.

6. The radiant heater of claim 1 wherein the insulation material further contains fiberglass fibers.

7. The radiant heater of claim 1 wherein the insulation material further contains titanium dioxide particulates and fiberglass fibers.

8. The radiant heater of claim 1 wherein the insulation material is obtained upon drying a foamed liquid slurry of the fused silica particulates.

9. The radiant heater of claim 8 wherein the foamed liquid slurry is heat dried to an elevated temperature.

10. The radiant heater of claim 8 wherein the liquid slurry further contains a foaming agent.

11. The radiant heater of claim 10 wherein the foaming agent is an organic detergent.

* * * * *